United States Patent Office 3,008,963
Patented Nov. 14, 1961

---

3,008,963
PRODUCTION OF PYRIDINE ALDEHYDES
Wilhelm Mathes and Walter Sauermilch, Ludwigshafen (Rhine), Germany, assignors to Dr. F. Raschig G.m.b.H. Chemische Fabrik, Ludwigshafen (Rhine), Germany
No Drawing. Filed Dec. 21, 1959, Ser. No. 860,691
Claims priority, application Germany June 24, 1959
7 Claims. (Cl. 260—297)

The present invention relates to an improved process for the production of pyridine aldehydes.

It is known that pyridine aldehydes can be produced upon a technical scale by the catalytic oxidation of methyl pyridines in the gas phase with air (U.S. Patent No. 2,749,351).

According to the invention it was unexpectedly found that the valuable pyridine aldehydes which are of versatile application can also be produced upon a technical scale from pyridine-N-oxide-carbinols. These starting materials are easily available from methyl substituted pyridines such as picolines, lutidine and the like by known procedures employing hydrogen peroxide and acetic acid (see, for example, Boeckelheide and Linn, J.A.C.S. 76, 1286). When these compounds are melted and heated further, a discoloration of the melt is observed and foaming occurs similar to a boiling phenomenon. Even after the source of heat is turned off, the decomposition reaction sometimes continues as it proceeds with liberation of heat. If the reaction mixture is examined after the decomposition manifestations it is found to possess a strong odor of pyridine aldehyde and considerable quantities of pyridine aldehyde can be recovered therefrom either chemically or by distillation. The reaction can be considered an intermolecular oxidation in which the N-oxide oxygen which is activated by the heating dehydrates the carbinol group of the same or a neighboring molecule to the aldehyde group with the liberation of water according to the equation

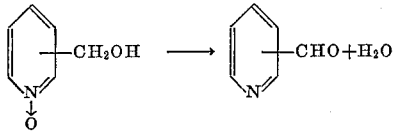

The water formation is easily demonstrated, for example, by diluting the reaction product with chloroform. The aldehyde dissolves in the chloroform while the water floats on top. In the case of hydrate forming aldehydes such as pyridine-4-aldehyde, the hydrated form is produced directly.

The thermal decomposition or intermolecular oxidation reaction according to the invention can be carried out under various conditions, the primary factor being that the starting pyridine-oxide-carbinol be heated to a temperature which is sufficiently high that such reaction takes place.

For example, the pyridine-oxide-carbinol can be subjected to a destructive distillation and the pyridine aldehyde produced recovered from the distillate. While the pyridine-N-oxide carbinols can be distilled without decomposition at extremely high vacuums of about 1–100 mm. Hg they decompose upon distillation at lower vacuums of, for example, 250 mm. Hg up to atmospheric pressure with the formation of pyridine aldehydes. The decomposition temperature depends upon the pressure employed and the nearer 760 mm. Hg is approached the higher the decomposition temperature.

However, as accumulations of heat may occur, particularly when larger quantities of the pyridine-N-oxide-carbinols are employed, which can lead to detonations, it is preferable to carry out the reaction according to the invention continuously by continuous supply of small quantities of the starting pyridine-N-oxide-carbinol to a heated reaction zone, for example, in an externally heated tube and to withdraw and condense the pyridine aldehyde and water vapor produced. Expediently, the pyridine-N-oxide-carbinol is supplied to the heated reaction zone together with an inert diluent such as water as in this way the reaction can be more readily controlled and furthermore the time during which the materials are subjected to the higher reaction temperature can be materially shortened. The time the materials should remain in the heated reaction zone depends upon the reaction temperature employed and should be longer the lower the reaction temperature selected or conversely the higher the reaction temperature selected the more and the quicker the materials can be passed through the reaction zone. The temperature of the reaction zone, for example, can be between about 250 and 450° C., preferably about 340° C. The optimum reaction conditions depend upon the particular pyridine-N-oxide-carbinol employed as the starting material and can easily be determined by routine tests.

The following examples will serve to illustrate the process according to the invention with reference to several specific embodiments.

Example 1

10 g. of pyridine-N-oxide-2-carbinol were placed in a small sausage shaped flask of about 30 cc. capacity and melted therein and the melt then heated further under a vacuum of 300 mm. Hg to about 200° C., the vapors produced, which distilled over at 155° C., were collected and condensed. 8.5 g. of distillate were obtained. The pyridine-aldehyde-2 contained in such distillate was recovered by adding about 20 cc. of 5-n aqueous sodium bisulfite and 13 cc. of 2-n $H_2SO_4$. 11.9 g. of pyridine-aldehyde-2-oxymethane sulfonic acid were precipitated which corresponds to a yield of 78.7% of pyridine-aldehyde-2. The free pyridine-aldehyde-2 can be recovered from such precipitate by treatment with a strong mineral acid (see U.S. Patent No. 2,260,342). The pyridine-aldehyde-2 also could be recovered from the distillate produced by extraction with chloroform evaporating the chloroform from the extract and distilling the aldehyde under vacuum.

Example 2

The melt of 5 g. of pyridine-N-oxide-3-carbinol in a Claisen flask of 30 cc. capacity was subjected to distillation at atmospheric pressure. At 260° C. a weakly yellow colored distillate was obtained from which 1.33 g. of pyridine-aldehyde-3-oxymethane sulfonic acid was precipitated as in Example 1. This corresponded to a 17.7% yield of pyridine-aldehyde-3.

Example 3

A solution of 10 g. of pyridine-N-oxide-4-carbinol in 10 cc. of water was slowly dropped into the inlet arm of a U-shaped aluminum tube which dipped into a potassium nitrate bath heated to 340° C. so that it was uniformly introduced over a period of 10 minutes. The arms of the U-shaped tube were about 880 mm. long and its inner diameter was 40 mm. The vapors produced were withdrawn through the other arm of the tube and condensed. The condensate was shaken 4 times with chloroform, each time with 20 cc., and the pyridine-aldehyde-4 in the extract precipitated as the pyridine-aldehyde-4-oxymethane sulfonic acid. 7.6 g. of such precipitate were obtained corresponding to a 46.1% yield of pyridine-aldehyde-4.

Example 4

10 g. of 6 methyl-pyridine-N-oxide-2-carbinol were melted and heated in a flask as in Example 1 to about 270° C. The vapors produced which distilled over at about 220° C. were collected and condensed. 7.6 grams of distillate were obtained which contained 6.2 g. of 6-methyl-pyridine-aldehyde-2 and a small quantity of water. The yield was 71% of the theoretical.

The above examples are only illustrative and the process according to the invention is also applicable to other pyridine-N-oxide-carbinols.

We claim:
1. A process for the production of a pyridine aldehyde selected from the group consisting of

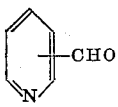

and the methyl homologues thereof which comprises heating a pyridine-N-oxide-carbinol selected from the group consisting of

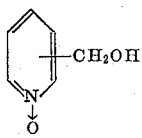

and the methyl homologues thereof to a temperature between the decomposition temperature thereof and about 450° C. and recovering the pyridine aldehyde produced from the reaction mixture.

2. The process of claim 1 in which the pyridine-N-oxide-carbinol is heated in admixture with an inert diluent liquid.

3. The process of claim 1 in which the pyridine-N-oxide-carbinol is heated in admixture with water.

4. The process of claim 1 in which said pyridine-N-oxide-carbinol is heated at a pressure between about 250 mm. Hg and 760 mm. Hg.

5. A process for the production of a pyridine aldehyde selected from the group consisting of

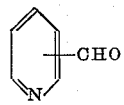

and the methyl homologues thereof which comprises continuously introducing a pyridine-N-oxide-carbinol selected from the group consisting of

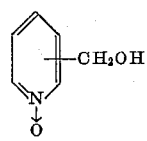

and the methyl homologues thereof into a reaction zone heated to 250–450° C. and continuously withdrawing the reaction mixture produced and recovering the pyridine aldehyde produced from such reaction mixture.

6. The process of claim 5 in which said pyridine-N-oxide-carbinol is introduced into said reaction zone in admixture with an inert diluent liquid.

7. The process of claim 6 in which said diluent liquid is water.

References Cited in the file of this patent

Boeckelheide et al.: J. Am. Chem. Soc., vol. 76, pages 1286–91 (1954).